United States Patent
Wang (10) Patent No.: US 8,836,908 B2
(45) Date of Patent: Sep. 16, 2014

(54) COF, COF CARRIER TAPE AND DRIVE CIRCUIT OF LIQUID CRYSTAL TELEVISION

(75) Inventor: Yun Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 118 days.

(21) Appl. No.: 13/380,141

(22) PCT Filed: Nov. 30, 2011

(86) PCT No.: PCT/CN2011/083247
§ 371 (c)(1),
(2), (4) Date: Dec. 22, 2011

(87) PCT Pub. No.: WO2013/071651
PCT Pub. Date: May 23, 2013

(65) Prior Publication Data
US 2013/0128211 A1  May 23, 2013

(30) Foreign Application Priority Data

Nov. 18, 2011 (CN) .......................... 2011 1 0369323

(51) Int. Cl.
*G02F 1/13* (2006.01)
*G02F 1/1339* (2006.01)

(52) U.S. Cl.
USPC ........................................ 349/187; 349/190

(58) Field of Classification Search
None
See application file for complete search history.

(56) References Cited

U.S. PATENT DOCUMENTS

| 5,907,381 A | 5/1999 | Komachi |
| 6,122,033 A * | 9/2000 | Mathew et al. ............... 349/155 |
| 2004/0022487 A1 * | 2/2004 | Nagasaka et al. ............... 385/31 |

FOREIGN PATENT DOCUMENTS

| CN | 1693244 | 11/2005 |
| CN | 1693244 A | 11/2005 |
| CN | 102224115 A | 10/2011 |
| JP | 2010060993 A | 3/2010 |
| KR | 20040011780 A | 2/2004 |

OTHER PUBLICATIONS

Office Action for CN201110369323.4 dated Jan. 29, 2013.
International Search Report for PCT/CN2011/083247.
Office Action for CN101834278 cited in prosecution of Chinese counterpart application.
Office Action for CN1873487 cited in prosecution of Chinese counterpart application.

* cited by examiner

Primary Examiner — Wen-Ying P Chen (57) ABSTRACT

An LCD panel, a manufacturing method and a manufacturing apparatus of the same are provided. The manufacturing method includes the following steps. The first substrate and the second substrate are combined and liquid crystal is disposed between the two substrates to form the LCD panel. The first substrate and the second substrate are fused. In the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealant of the LCD panel in the manufacturing process of the LCD panel to cause the liquid crystal leakage.

9 Claims, 7 Drawing Sheets

COF, COF CARRIER TAPE AND DRIVE CIRCUIT OF LIQUID CRYSTAL TELEVISION

BACKGROUND

1. Technical Field

The present disclosure relates to the field of LCD panel technology, and more particularly relates to an LCD panel and a manufacturing method of the same.

2. Description of Related Art

Liquid crystal display (LCD) is a kind of flat panel display (FPD) that display images by using characteristics of liquid crystal material. The LCD device has advantages of thin, light, low driving voltage and low power consumption in comparison with other display devices and has become the mainstream product on the consumption market. A current manufacturing method of the LCD panel may be substantially divided into a front-end array process, a middle-end cell process and a back-end module process. In the front-end array process, a thin film transistor (TFT) array substrate and a colour filter (CF) substrate are manufactured. In the middle-end cell process, the TFT substrate and the CF substrate are combined, liquid crystal is injected therebetween, and then a panel conforming to the product size is cut. In the back-end module process, the panel is assembled with a backlight module, a panel driving circuit, a frame and the like.

Figure 1:
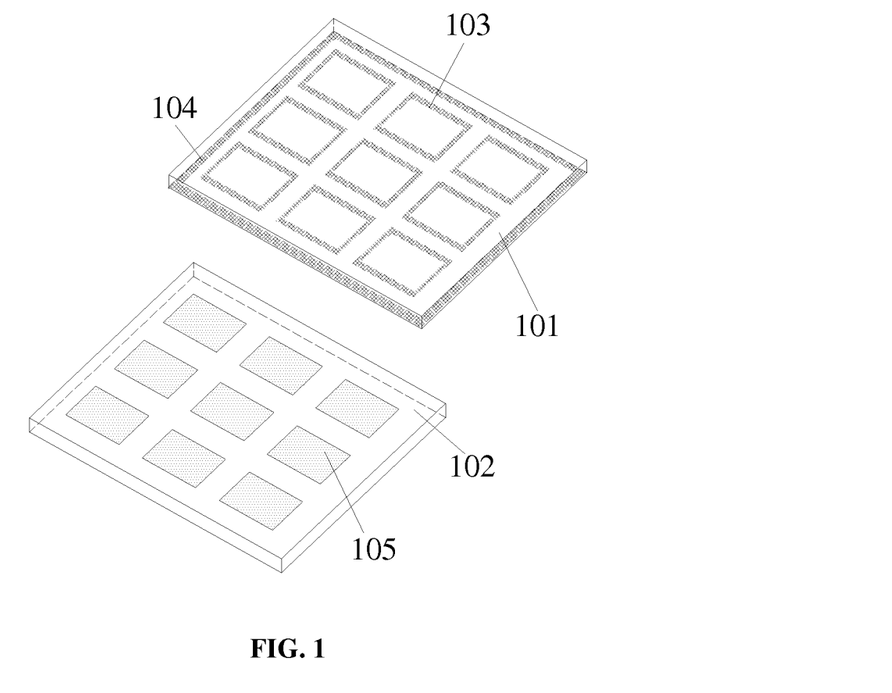
FIG. 1 is a schematic structural view of an LCD panel in the prior art.

As shown in FIG. 1, in the cell process, firstly, a main sealant 103 and an auxiliary sealant 104 are disposed on an upper substrate 101. Liquid crystal 105 is dropped on a lower substrate 102. The upper substrate 101 and the lower substrate 102 are vacuum combined to isolate the liquid crystal 105 between the two substrates 101, 102 from the atmosphere. Next, the sealant of the combined substrates 101, 102 is cured. Finally, the panel conforming to the product size is cut. Since in the course of sealant curing after the vacuum combining, the sealant is difficult to be quickly cured, the atmosphere may break the sealant of the LCD panel staying in the air to cause undesirable phenomenon like the liquid crystal leakage, which adversely affects the manufacturing effect of the LCD panel. In addition, the sealant coating is a process that requires a high precision, stability and uniformity. Therefore, in the manufacturing process, the operation error of the sealant coating directly influences the quality of the LCD panel.

SUMMARY

The primary objective of the present disclosure is to provide an LCD panel manufacturing method, for improving the processing technique of manufacturing the LCD panel.

The present disclosure provides a manufacturing method of an LCD panel, which includes the following steps:

a first substrate and a second substrate are combined and liquid crystal is disposed between the two substrates, thus forming an LCD panel;

the first substrate and the second substrate are fused.

Preferably, the LCD panel has multiple LCD units with sealants disposed surrounding the LCD units.

The step of fusing the first substrate and the second substrate includes: laser beams are emitted to the surrounding of the first substrate and the second substrate and meanwhile coolants are sprayed to the laser beam irradiated areas to make the first substrate and the second substrate fused.

Preferably, after the step of fusing the first substrate and the second substrate, the method further includes performing a sealant curing process on the fused LCD panel.

Preferably, the LCD panel includes multiple LCD units, and the step of fusing the first substrate and the second substrate includes the following steps:

laser beams are emitted to the surroundings of LCD units respectively, and meanwhile coolants are sprayed to the laser beam irradiated areas to make the first substrate and the second substrate fused at the surroundings of the LCD units.

Preferably, the method further includes performing an edge grinding process on the fused area of the LCD panel.

Preferably, the coolant is $CO_2$.

Preferably, before the step of fusing the first substrate and the second substrate, the method further includes aligning the first substrate and the second substrate through CCD to make laser emitting devices right corresponding to fusing areas of the first substrate and the second substrate.

The present disclosure also provides a manufacturing apparatus of the LCD panel, which includes a dropping device for dropping liquid crystal on a first substrate, a combining device for combining the first substrate and the second substrate with the liquid crystal dropped thereon, a carrying device for supporting the combined first substrate and second substrate, a hot-fusing device and a cooling device for fusing the first substrate and the second substrate placed on the carrying device, and an aligning device for making the fusing area of the first substrate and the second substrate right corresponding to the hot-fusing device.

Preferably, the manufacturing apparatus further includes a coating device for coating the sealants on the second substrate, and a curing device for curing the sealants of the first substrate and the second substrate.

Preferably, the hot-fusing device emits laser beams to the fusing areas of the first substrate and the second substrate and meanwhile the cooling device sprays coolants on laser beam irradiated areas.

Preferably, the coolant is $CO_2$.

The present disclosure also provides an LCD panel, which includes a first substrate and a second substrate. Liquid crystal is disposed between the two substrates, and the first substrate and the second substrate are permanently assembled by fusing.

Preferably, the first substrate and the second substrate form multiple LCD units, and sealants are disposed surrounding the LCD units. The first substrate and the second substrate are permanently combined by emitting laser beams to the surrounding of the first substrate and the second substrate and meanwhile spraying coolants to laser beam irradiated areas.

Preferably, the first substrate and the second substrate form multiple LCD units. The first substrate and the second substrate are permanently combined by emitting the laser beams to the surroundings of the LCD units and meanwhile spraying the coolants to the laser beam irradiated areas.

In the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealant of the LCD panel in the manufacturing process of the LCD panel to cause the liquid crystal leakage. In addition, the surroundings of the LCD units are fused according to the present disclosure, which replaces the sealant in the prior art, so that the sealant coating process in the manufacturing of the LCD panel is not required and the processes including a sealant check, a sealant debubble and a sealant cure process are not required, thus greatly reducing the manufacturing cost of the LCD panel and improving the processing technique of manufacturing the LCD panel.

DETAILED DESCRIPTION

To make the objectives, technical solutions, and advantages of the present disclosure become more apparent, the present disclosure is further described below in detail with reference to the accompanying drawings and embodiments. It should be understood that, the specific embodiments described herein are mainly intended to demonstrate the present disclosure, instead of restricting the present disclosure.

Figure 2:
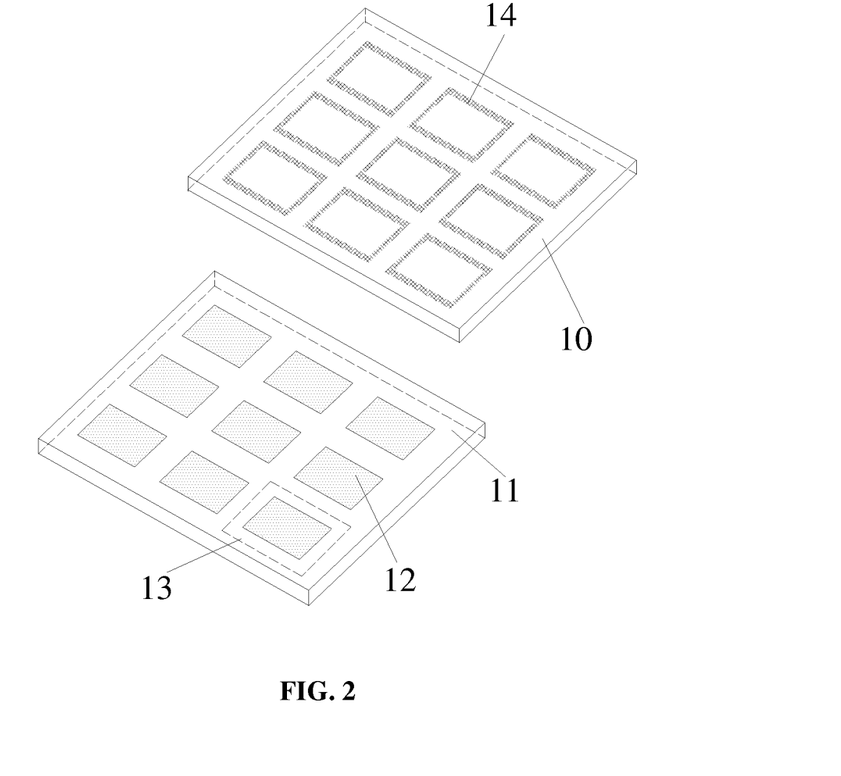
FIG. 2 is a schematic structural view of an LCD panel according to a first embodiment of the present disclosure.

FIG. 2 is a schematic structural view of an LCD panel according to a first embodiment of the present disclosure. Referring to FIG. 2, the LCD panel includes a first substrate 10 and a second substrate 11. Liquid crystal 12 is disposed between the two substrates. The first substrate 10 and the second substrate 11 are permanently combined by fusing.

In specific, in this embodiment, firstly, the LCD panel is aligned through CCD, and laser emitting devices are disposed both upon an upper side and under a lower side of the LCD panel. Subsequently, the laser emitting devices are controlled to emit laser beams to the LCD panel, and meanwhile coolants are sprayed to laser beam irradiated areas of the LCD panel, so that the first substrate 10 and the second substrate 11 of the LCD panel are melted at the laser beam irradiated areas and rapidly cooled to form the fusion. The coolant may be $CO_2$ or other coolants. Multiple laser emitting devices may be disposed upon the upper side and under the lower side of the LCD panel to accelerate the fusing of the first substrate 10 and the second substrate 11.

In the embodiments of the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealed LCD panel in the manufacturing process of the LCD panel to cause the liquid crystal leakage.

The first substrate 10 and the second substrate 11 form multiple LCD units 13. Sealants 14 for sealing the liquid crystal 12 are disposed at the surroundings of the LCD units 13. The first substrate 10 and the second substrate 11 are fused at the surroundings of the LCD units 13 by emitting the laser beams to the first substrate 10 and the second substrate 11 and meanwhile spraying the coolants to the laser beam irradiated areas. After fusing, a sealant curing process is performed to the fused LCD panel.

Figure 3:
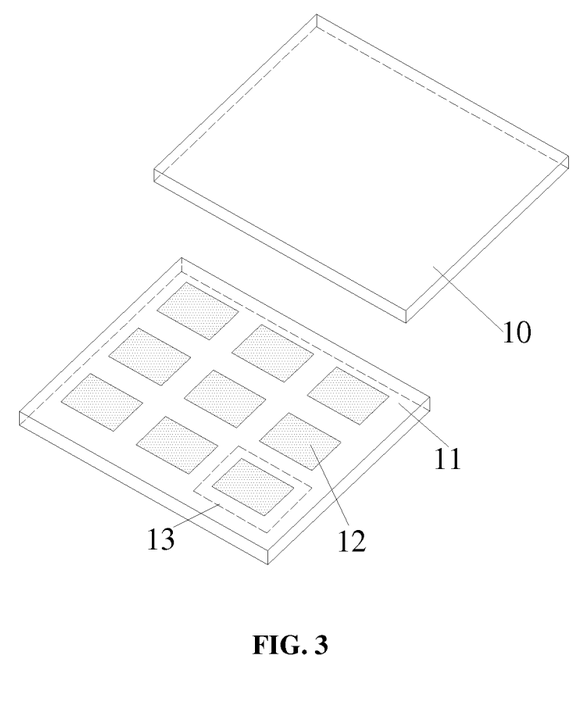
FIG. 3 is a schematic structural view of an LCD panel according to a second embodiment of the present disclosure.

FIG. 3 is a schematic structural view of an LCD panel according to a second embodiment of the present disclosure. Referring to FIG. 3, different from the above embodiment, in this embodiment, the first substrate 10 and the second substrate 11 form multiple LCD units 13, and the surroundings of the LCD units 13 are fused. It should be explained that during fusing, the first substrate 10 and the second substrate 11 are melted at the high temperature and then solidified, so when the surroundings of the LCD units 13 are being fused, the black matrix (BM) and the metal pattern must be avoided to prevent the fusing causing damages to internal devices in the LCD units 13.

In the embodiments of the present disclosure, the surroundings of the LCD units 13 are fused, which replaces the sealant in the prior art, so that the sealant coating process in the manufacturing of the LCD panel can be omitted and the processes including a sealant check, a sealant debubble and a sealant cure process are not required, thus greatly reducing the manufacturing cost of the LCD panel and improving the processing technique of manufacturing the LCD panel.

Figure 4:
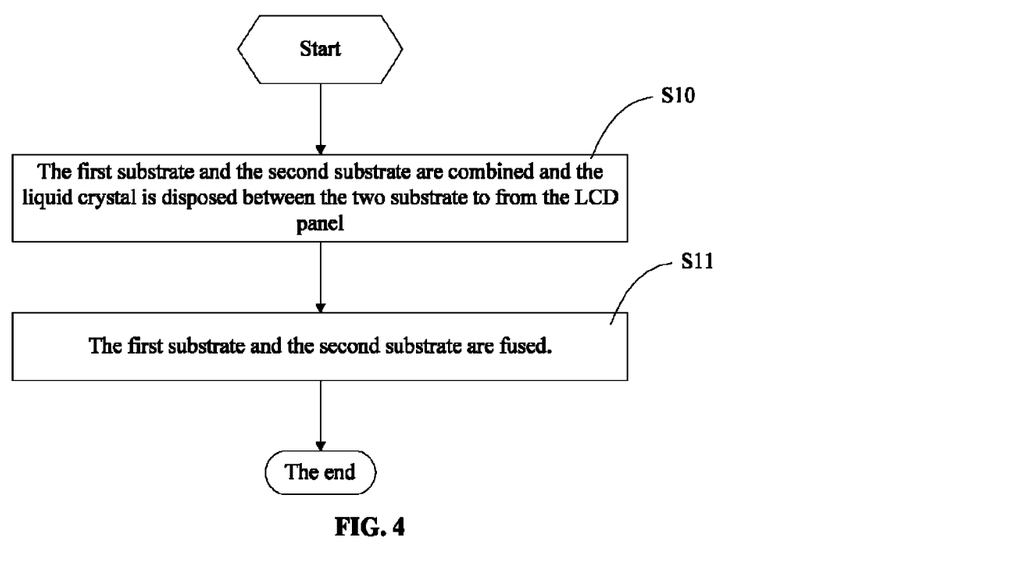
FIG. 4 is a schematic flow chart of a manufacturing method of an LCD panel according to the first embodiment of the present disclosure.

FIG. 4 is a schematic flow chart of a manufacturing method of an LCD panel according to a first embodiment of the present disclosure. Referring to FIG. 4, the manufacturing method of the LCD panel according to this embodiment of the present disclosure includes the following steps:

In step S10, the first substrate 10 and the second substrate 11 are combined and the liquid crystal 12 is disposed between the two substrates 10, 11 to form the LCD panel.

In an embodiment of the present disclosure, firstly, the liquid crystal 12 is dropped on the first substrate 10 or the second substrate 11. Subsequently, in the vacuum environment, the first substrate 10 and the second substrate 11 are aligned and combined to form the LCD panel.

In step S11, the first substrate 10 and the second substrate 11 are fused.

To fuse the LCD panel formed in step S10, firstly, the first substrate 10 and the second substrate 11 are melted at the laser beam irradiated areas under the high temperature at the same time. Subsequently, the melted area is instantly cured by coolants, so that the LCD panel is fused to assemble the first substrate 10 and the second substrate 11.

In the embodiments of the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealed LCD panel in the manufacturing process of the LCD panel to cause the liquid crystal leakage.

In this embodiment, firstly, the LCD panel is aligned through CCD, the laser emitting devices are disposed both upon an upper side and under a lower side of the LCD panel. Subsequently, the laser emitting devices are controlled to emit the laser beams to the LCD panel at the same time, and meanwhile the coolants are sprayed to the laser beam irradiated areas of the LCD panel, so that the first substrate 10 and the second substrate 11 of the LCD panel are melted at the laser beam irradiated areas and rapidly cooled to form the fusion. The coolant may be $CO_2$ or other coolants. Multiple the laser emitting devices may be disposed upon the upper side and under the lower side of the LCD panel to accelerate the fusing of the first substrate 10 and the second substrate 11. Definitely, the present disclosure is not limited to the above fusing method, and all the methods capable of melting and rapidly solidifying the LCD panel to achieve the purpose of fusing the first substrate 10 and the second substrate 11 fall within the protection scope of the present disclosure.

The LCD panel may be a small-size LCD panel with a single LCD unit, and may also be a large-size LCD panel with multiple LCD units. After the large-size LCD panel is fabricated, the large-size LCD panel is cut into small LCD panels i.e. the LCD units with a variety of sizes.

Figure 5:
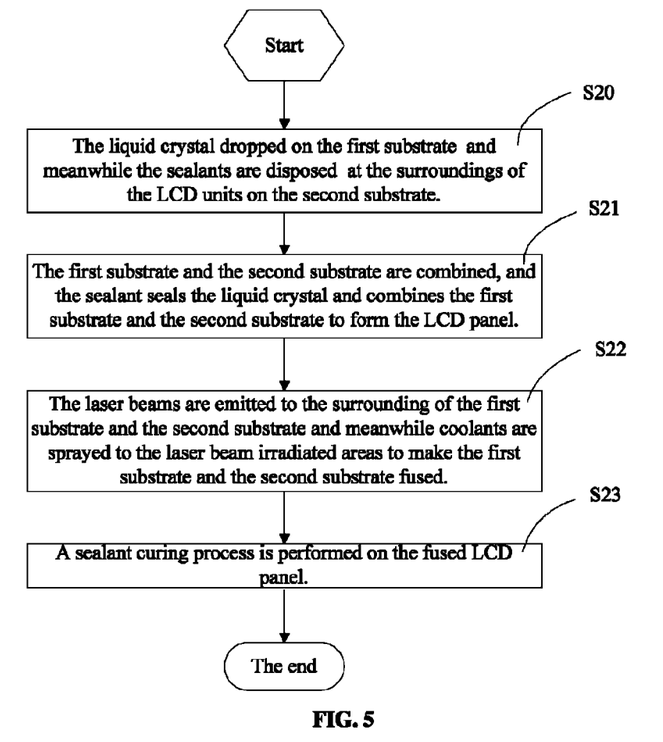
FIG. 5 is a schematic flow chart of a manufacturing method of an LCD panel according to a second embodiment of the present disclosure.

FIG. 5 is a schematic flow chart of a manufacturing method of an LCD panel according to a second embodiment of the present disclosure. The manufacturing method of the LCD panel according to this embodiment includes the following steps:

In step S20, the liquid crystal 12 is dropped on the first substrate 10, and meanwhile the sealants 14 are disposed at the surroundings of the LCD units 13 on the second substrate 11.

In step S21, the first substrate 10 and the second substrate 11 are combined, and the sealants 14 seal the liquid crystal 12 and bonds the first substrate 10 and the second substrate 11 to form the LCD panel.

In step S22, the laser beams are emitted to the surrounding of the first substrate 10 and the second substrate 11, and meanwhile the coolants are sprayed to the laser beam irradiated areas to make the first substrate 10 and the second substrate 11 fused.

In step S23, a sealant curing process is performed to the fused LCD panel.

By performing the sealant curing process to the fused LCD panel, the sealant is cured.

After the LCD panel is fabricated, an edge grinding process is performed on the fused areas of the LCD panel. The edge grinding process may be performed on the fused areas surrounding the LCD panel, and may also be performed on the fused areas surrounding the LCD units after the LCD panel is cut into multiple LCD units.

In the embodiments of the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealed LCD panel in the manufacturing process of the LCD panel to cause the liquid crystal leakage.

Figure 6:
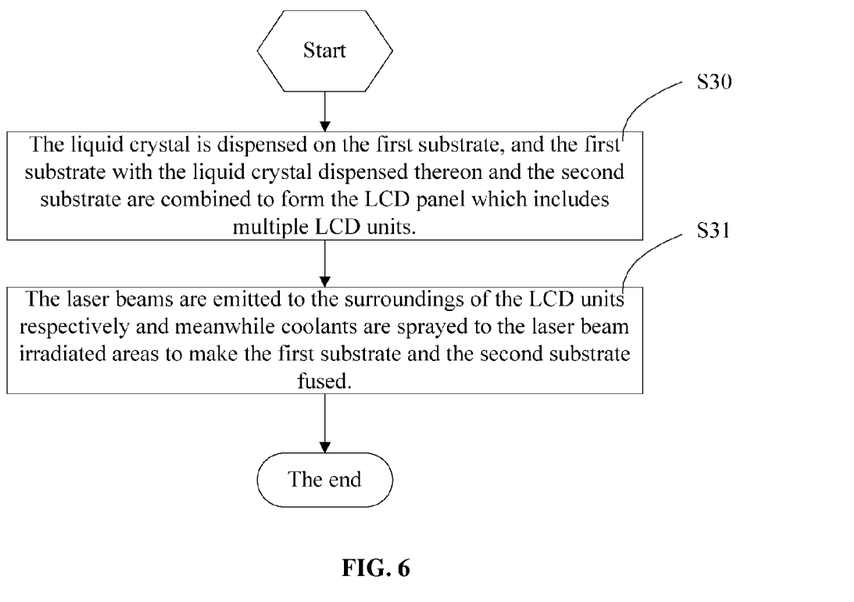
FIG. 6 is a schematic flow chart of a manufacturing method of an LCD panel according to a third embodiment of the present disclosure.

FIG. 6 is a schematic flow chart of a manufacturing method of an LCD panel according to a third embodiment of the present disclosure. The manufacturing method of the LCD panel according to this embodiment includes the following steps:

In step S30, the liquid crystal 12 is dropped on the first substrate 10, and the first substrate 10 with the liquid crystal 12 dropped thereon and the second substrate 11 are combined to form the LCD panel. The LCD panel includes multiple LCD units 13.

In an embodiment of the present disclosure, firstly, the liquid crystal is dropped on the first substrate 10. Subsequently, in the vacuum environment, the first substrate 10 and the second substrate 11 are aligned and vacuum combined to form the LCD panel.

In step S31, the laser beams are emitted to the surroundings of the LCD units 13 respectively, and meanwhile the coolants are sprayed to the laser beam irradiated areas to make the first substrate 10 and the second substrate 11 fused.

The fusing method of step S31 is same as that of step S11 of the first embodiment, so the details will not be repeated herein. It should be explained that in the fusing process, the LCD panel is melted at the high temperature and then solidified, so when the surroundings of the LCD units 13 are fused, the black matrix (BM) and the metal pattern must be avoided to prevent the fusing causing damages to internal devices in the LCD units.

After the LCD panel is fabricated, the edge grinding process is performed to the fused areas of the LCD panel. The edge grinding process may be performed to the fused areas surrounding the LCD panel, and may also be performed on the fused areas surrounding the LCD units 13 after the LCD panel is cut into multiple LCD units 13.

In the embodiments of the present disclosure, the surroundings of the LCD units LCD units 13 are fused, which replaces the sealant in the prior art, so that the sealant coating process in the manufacturing of the LCD panel is not required and the processes including a sealant check, a sealant debubble and a sealant cure process are not required, thus greatly reducing the manufacturing cost of the LCD panel and improving the processing technique of manufacturing the LCD panel.

Figure 7:
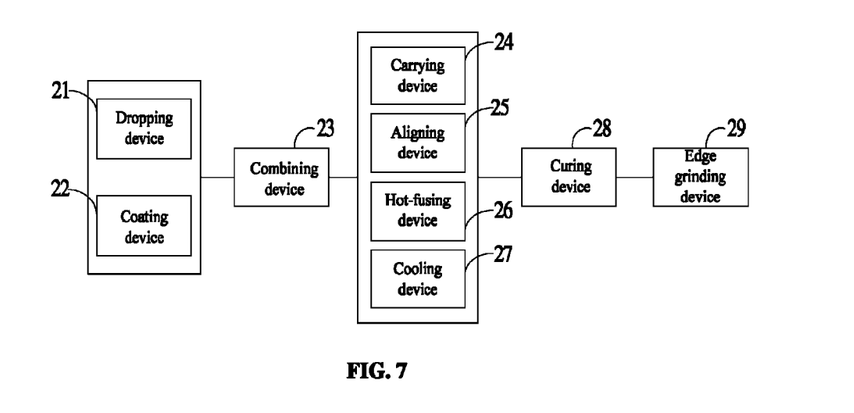
FIG. 7 is a schematic structural view of a manufacturing apparatus of an LCD panel according to a first embodiment of the present disclosure.

FIG. 7 is a schematic structural view of a manufacturing apparatus of an LCD panel according to a first embodiment of the present disclosure. Referring to FIG. 7, the manufacturing apparatus of the LCD panel includes a dropping device 21, a coating device 22, a combining device 23, a carrying device 24, an aligning device 25, a hot-fusing device 26, a cooling device 27, a curing device 28 and an edge grinding device 29.

The dropping device 21 is used to drop the liquid crystal 12 on the first substrate 10, and the coating device 22 is used to coat the sealant 14 on the second substrate 11. Definitely, the dropping device 21 may also drop the liquid crystal 12 on the second substrate 11 and the coating device 22 coats the sealant 14 on the first substrate 10. When the LCD panel includes multiple LCD units 13, the dropping device 21 is controlled to drop the liquid crystal 12 in the LCD units 13 formed by the first substrate 10, and the coating device 22 is controlled to coat the sealant 14 for sealing the liquid crystal 12 at the corresponding positions on the LCD units 13.

The combining device 23 is used to align and combine the first substrate 10 and the second substrate 11 in the vacuum environment to form the LCD panel. The carrying device 24 is used to place the LCD panel. The aligning device 25 is used to make the edge of the first substrate 10 and the second substrate 11 right corresponding to the hot-fusing device 26.

The hot-fusing device 26 is controlled to emit the laser beams to melt the edge of the first substrate 10 and the second substrate 11, and meanwhile the cooling device 27 is controlled to spray the coolants to instantly solidify the melted area. The hot-fusing device 26 and the cooling device 27 are controlled to move along the edge of the first substrate 10 and the second substrate 11 until the surrounding of the first substrate 10 and the second substrate 11 are completely sealed. It should be explained that two hot-fusing devices 26 and two cooling devices 27 form one group, which are respectively disposed upon the upper side and under the lower side of the LCD panel. Definitely, multiple groups may also be disposed to accelerate the fusing of the first substrate 10 and the second substrate 11.

The curing device 28 is used to cure the sealant of the fused first substrate 10 and second substrate 11. The edge grinding device 29 is used to perform the edge grinding process on the fused area of the first substrate 10 and the second substrate 11.

In the embodiments of the present disclosure, the interior of the combined LCD panel is isolated from the outside atmosphere by fusing the combined LCD panel. Therefore, the LCD panel can stay in the air for a long time without being damaged, thus solving the problem in the prior art that the atmosphere may break the sealant of the LCD panel in the manufacturing process of the LCD panel to cause the liquid crystal leakage.

Figure 8:
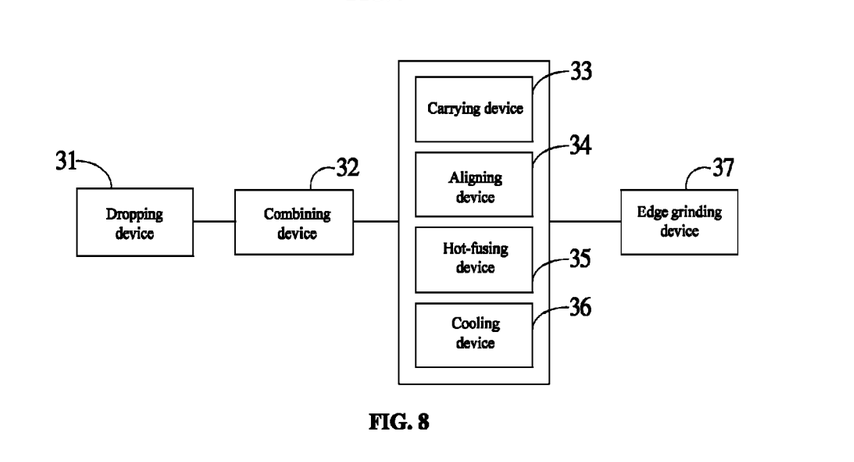
FIG. 8 is a schematic structural view of a manufacturing apparatus of an LCD panel according to a second embodiment of the present disclosure.

FIG. 8 is a schematic structural view of a manufacturing apparatus of an LCD panel according to a second embodiment of the present disclosure. Referring to FIG. 8, the manufacturing apparatus of the LCD panel includes a dropping device 31, a combining device 32, a carrying device 33, an aligning device 34, a hot-fusing device 35, a cooling device 36 and an edge grinding device 37. With reference to FIG. 3 together, the manufacturing processes of the LCD panel are described as follows.

The dropping device 31 is used to drop the liquid crystal 12 on the first substrate 10. Definitely, the dropping device 31 may also drop the liquid crystal 12 on the second substrate 11. The LCD panel includes multiple LCD units 13, the dropping device 31 controlled to drop the liquid crystal 12 in the LCD units 13 formed by the first substrate 10. The combining device 32 is used to align and combine the first substrate 10 and the second substrate 11 in the vacuum environment to form the LCD panel.

The carrying device 33 is used to place the LCD panel. The aligning device 34 is used to make the edge of the LCD units 13 formed by the first substrate 10 and the second substrate 11 right corresponding to the hot-fusing device 35. The hot-fusing device 35 is used to emit the laser beams to the surroundings of the LCD units 13, and meanwhile the cooling device 36 is controlled to spray the coolants to instantly solidify the melted area. The hot-fusing device 35 and the cooling device 36 are controlled to move along the surroundings of the LCD units 13 until the surroundings of the LCD units 13 are completely sealed. It should be explained that two hot-fusing devices 35 and two cooling devices 36 form one group, which are respectively disposed upon the upper side and under the lower side of the LCD panel. After one LCD unit 13 is fused, the aligning device makes the surrounding of another LCD unit 13 right under the hot-fusing device 35. Definitely, multiple groups may be disposed to fuse all the LCD units 13 at the same time to accelerate the fusing of the first substrate 10 and the second substrate 11.

The edge grinding device 37 is used to perform the edge grinding process on the fused area of the LCD units 13 after the first substrate 10 and the second substrate 11 are cut into multiple LCD units 13.

In the embodiments of the present disclosure, the surroundings of the LCD units 13 are fused, which replaces the sealant in the prior art, so that the sealant coating process in the manufacturing of the LCD panel is not required and the processes including a sealant check, a sealant debubble and a sealant cure process are not required, thus greatly reducing the manufacturing cost of the LCD panel and improving the processing technique of manufacturing the LCD panel.

The above descriptions are merely taken as the preferred embodiment of the present disclosure, but not intended to restrict the present disclosure. Any modification, equivalent replacement, and improvement that fall within the spirit and principle of the present disclosure are included in the protection scope of the claims of the present disclosure.

What is claimed is:

1. A manufacturing method of an LCD panel, comprising:
combining a first substrate and a second substrate and disposing liquid crystal between the two substrates to form the LCD panel;
fusing the first substrate and the second substrate; and
performing an edge grinding process on the fused area of the LCD panel;
wherein the LCD panel comprises multiple LCD units, each of the LCD units is surrounded by a sealant, and the step of fusing the first substrate and the second substrate comprises:
emitting laser beams to an edge of the first substrate and an edge of the second substrate and meanwhile spraying coolants to laser beam irradiated areas to make the first substrate and the second substrate fuse.

2. The manufacturing method of the LCD panel according to claim 1, wherein after the step of fusing the first substrate and the second substrate, the method further comprises:
performing a sealant curing process on the fused LCD panel.

3. The manufacturing method of the LCD panel according to claim 1, wherein the coolant is $CO_2$.

4. The manufacturing method of the LCD panel according to claim 1, wherein before the step of fusing the first substrate and the second substrate, the method further comprises:
aligning the first substrate and the second substrate through CCD and making a laser emitting device right corresponding to a fusing area of the first substrate and the second substrate.

5. A manufacturing apparatus of an LCD panel, comprising a dropping device for dropping liquid crystal on a first substrate, a combining device for combining the first substrate and a second substrate with the liquid crystal dropped therebetween, a carrying device for supporting the combined first substrate and second substrate, a hot-fusing device and a cooling device for fusing the first substrate and the second substrate placed on the carrying device, and an aligning device for making the fusing area of the first substrate and the second substrate right corresponding to the hot-fusing device, and a grinding device for grinding an edge of the fused area of the LCD panel; wherein the hot-fusing device emits laser beams to the fusing area of the first substrate and the second substrate and meanwhile the cooling device sprays coolants on laser beam irradiated areas.

6. The manufacturing apparatus of the LCD panel according to claim 5, further comprising a coating device for coating a sealant on the second substrate, and a curing device for curing the sealant of the first substrate and the second substrate.

7. The manufacturing apparatus of the LCD panel according to claim 5, wherein the coolant is $CO_2$.

8. A manufacturing method of an LCD panel, comprising:
combining a first substrate and a second substrate and disposing liquid crystal between the two substrates to form the LCD panel;
fusing the first substrate and the second substrate; and
performing an edge grinding process on the fused areas of the LCD panel;
wherein the LCD panel comprises multiple LCD units, and the step of fusing the first substrate and the second substrate comprises:
emitting laser beams to the surroundings of the LCD units respectively and meanwhile spraying coolants to the laser beam irradiated areas to make the first substrate and the second substrate fuse at the surroundings of the LCD units.

9. The manufacturing method of the LCD panel according to claim 8, wherein the coolant is $CO_2$.

* * * * *

UNITED STATES PATENT AND TRADEMARK OFFICE
CERTIFICATE OF CORRECTION

PATENT NO. : 8,836,908 B2
APPLICATION NO. : 13/380141
DATED : September 16, 2014
INVENTOR(S) : Yun Wang It is certified that error appears in the above-identified patent and that said Letters Patent is hereby corrected as shown below:

On the Title Page, item (54), and in the Specification, col. 1, line 1, the correct title should be "LIQUID CRYSTAL DISPLAY PANEL, MANUFACTURING METHOD AND APPARATUS OF THE SAME" instead of "COF, COF CARRIER TAPE AND DRIVE CIRCUIT OF LIQUID CRYSTAL TELEVISION".

Signed and Sealed this
Sixth Day of January, 2015

Michelle K. Lee
*Deputy Director of the United States Patent and Trademark Office*